(12) United States Patent
Venus (10) Patent No.: US 7,513,678 B2
(45) Date of Patent: Apr. 7, 2009

(54) ROTARY MIXING DEVICE IN MOLDED PACKAGING

(76) Inventor: Donald W. Venus, 4702 Hawkins Rd., Richfield, OH (US) 44286

( * ) Notice: Subject to any disclaimer, the term of this patent is extended or adjusted under 35 U.S.C. 154(b) by 517 days.

(21) Appl. No.: 10/889,600

(22) Filed: Jul. 12, 2004

(65) Prior Publication Data
US 2005/0007869 A1    Jan. 13, 2005

Related U.S. Application Data (60) Provisional application No. 60/569,999, filed on May 11, 2004, provisional application No. 60/486,075, filed on Jul. 10, 2003.

(51) Int. Cl.
*B01F 7/26* (2006.01)
(52) U.S. Cl. .................. 366/129; 366/317; 366/605
(58) Field of Classification Search ... 366/330.1–330.7, 366/64–65, 315–317, 262–265, 342–343, 366/96–98, 139, 66, 605; 416/231 R, 231 A, 416/231 B; 403/360; 206/576, 219–222; 415/231 R, 231 A, 231 B
See application file for complete search history.

(56) References Cited

U.S. PATENT DOCUMENTS

| | | | | |
|---|---|---|---|---|
| 623,668 | A * | 4/1899 | Holt, Jr. ................. | 366/252 |
| 1,571,735 | A * | 2/1926 | Queisser ................ | 416/185 |
| 1,919,970 | A * | 7/1933 | Woods .................. | 416/184 |
| 2,833,576 | A * | 5/1958 | Cirone .................. | 403/334 |
| 2,984,462 | A * | 5/1961 | O'Connor .............. | 366/316 |
| 3,170,638 | A * | 2/1965 | Burton .................. | 241/46.17 |
| 3,630,636 | A * | 12/1971 | Hill ...................... | 416/199 |
| 3,690,621 | A * | 9/1972 | Tanaka et al. ........... | 366/265 |
| 4,012,155 | A * | 3/1977 | Morris .................. | 403/290 |
| 4,021,024 | A * | 5/1977 | Stasi .................... | 366/97 |
| 4,506,989 | A * | 3/1985 | Reh ..................... | 366/270 |
| 4,589,778 | A * | 5/1986 | Mitchell ................ | 366/316 |
| 4,813,787 | A * | 3/1989 | Conn .................... | 366/296 |
| 4,893,941 | A * | 1/1990 | Wayte .................. | 366/265 |
| 4,900,159 | A * | 2/1990 | Jamison ................ | 366/343 |
| 5,407,271 | A * | 4/1995 | Jorgensen et al. ....... | 366/265 |
| 5,865,539 | A | 2/1999 | Rogers | |
| 6,325,532 | B1 * | 12/2001 | King et al. ............. | 366/129 |
| 6,520,672 | B1 * | 2/2003 | Whitney ................ | 366/129 |
| 6,616,318 | B1 * | 9/2003 | LeBlanc et al. ......... | 366/129 |
| 6,688,764 | B2 * | 2/2004 | King .................... | 366/129 |
| 7,316,502 | B2 * | 1/2008 | Freeman ................ | 366/316 |

(Continued)

FOREIGN PATENT DOCUMENTS

| | | | |
|---|---|---|---|
| DE | 3438766 | A1 * | 4/1986 |
| DE | 3616203 | A1 * | 11/1987 |
| DE | 1950433 | A1 * | 8/1996 |

(Continued)

*Primary Examiner*—Charles E Cooley
(74) *Attorney, Agent, or Firm*—Richard M. Klein; Fay Sharpe LLP (57) ABSTRACT

The present disclosure relates to a rotary mixing device that is easy to produce, assemble, use and dispose of. The device comprises a shaft, and at least one mixing member. The shaft and mixing member are formed of the same composite material and are produced by molding the components in essentially a single plane. Moreover, the runners that provide the liquid polymer material to form the components of the rotary mixing device also serve as holding elements. Consequently, a one-piece, single shot molded unit is produced containing the components and the holding elements.

7 Claims, 10 Drawing Sheets

U.S. PATENT DOCUMENTS

2004/0066704 A1* 4/2004 Hong .................. 366/129
2005/0007869 A1* 1/2005 Venus ................. 366/129
2005/0241965 A1* 11/2005 Kurc .................. 206/219

FOREIGN PATENT DOCUMENTS

FR  2329333  *  5/1977
JP  63059341 A  *  3/1988

* cited by examiner

ROTARY MIXING DEVICE IN MOLDED PACKAGING

CROSS REFERENCE TO RELATED APPLICATIONS

This application claims priority from U.S. Provisional Patent Application Ser. No. 60/486,075 filed Jul. 10, 2003 and U.S. Provisional Patent Application Ser. No. 60/569,999 filed May 11, 2004, both of which are incorporated herein by reference.

BACKGROUND

The present disclosure relates to the art of rotary mixing devices. More particularly, the disclosure is directed to a rotary mixer for efficient mixing and stirring liquids, compounds, particulate matter, and other materials. The disclosure is also directed to a rotary mixer which is easy to produce, assemble and utilize. Optionally, the rotary mixer is also readily disposable and recyclable upon completion of use thereby minimizing cleanup time and expense.

In this regard, rotary mixing devices, such as rotary paint mixers and cement mixers, are well known and are readily utilized by commercial contractors and homeowners. These rotary mixing devices are designed to allow the task of mixing to be accomplished more quickly, more efficiently and with less manual labor. Many of these devices consist of a solid metallic shaft having one or more fixed blades for mixing the paint or other solution or aggregate to be utilized. These devices are three-dimensional in structure and are, in many instances, difficult to use and time consuming to clean. One who has experimented with conventional mixing devices will be aware of still further deficiencies and difficulties that one must confront in utilizing such devices.

In light of the foregoing, it becomes evident that there is a need for a rotary mixing device that would provide a solution to one or more of the deficiencies from which the prior art and/or conventional mixing devices have suffered. It is still more clear that a rotary mixing device providing a solution to each of the needs left by the prior art while providing a number of heretofore unrealized advantages thereover would represent an advance in the art. Accordingly, it would be desirable to develop a rotary mixing device that can be easily assembled, utilized and then subsequently disposed of or recycled by the end user.

BRIEF DESCRIPTION

In an exemplary embodiment of the disclosure, a disposable and recyclable rotary mixing device is provided. The rotary mixing device consists of a polymeric shaft and one or more polymeric mixing discs. The components are preferably formed of the same material and are produced by molding the components in essentially a single plane. Moreover, the runners that provide the liquid polymer material to form the components of the rotary mixing device also serve as holding elements. Consequently, a one-piece, single shot molded unit is produced containing the components and the holding elements. The polymer material also preferably readily accepts printing or inking materials, allowing for instructions, promotional information and the like to be applied directly to the molded product. This combination eliminates the need for additional packaging material.

When usage is desired, the rotary mixing device can be easily assembled by the end user. The polymeric shaft and one or more of the polymeric discs are detached for the runners, which hold the molded components together. The shaft can then be inserted or joined with a motor, such as a drill motor, to produce rotary motion. Upon completion of usage, the entire assembled unit can be easily discarded. This avoids any additional clean-up steps that can be time-consuming and/or expensive.

In accordance with a further aspect of the present disclosure, the rotary mixer comprises a shaft and at least one mixing member is provided. The shaft includes a first portion and a second portion. The mixing member includes at least one centrally positioned boss which extends axially from at least one surface of the mixing member. The boss is adapted to receive the first portion of the shaft. A rim extends circumferentially around the mixing member. A plurality of blades extends radially between the boss and the rim, wherein a trailing edge of at least one of the plurality of blades extends below the rim.

In accordance with another aspect of the present disclosure, the rotary mixer comprises a shaft, a first mixing member and a second mixing member. The shaft includes a first portion and a second portion. The first and second mixing members include first and second centrally positioned bosses which extend axially from respective first and second surfaces of the first and second mixing members. Each boss receives the first portion of the shaft. A rim extends circumferentially around the first and second mixing members. The first and second mixing members further include a plurality of blades. Each blade has an inner end connected adjacent an end portion of each boss and an outer end connected to the rim, wherein a trailing edge of at least one of the plurality of blades extends below the rim. In an alternative embodiment, the trailing edge of at least one of the plurality of the blades extends above the rim.

In accordance with still another aspect of the present disclosure, a method of forming a rotary mixer comprises the steps of (a) providing a mold; (b) molding a shaft, at least one mixing member, at least one planar member and a frame member; (c) molding a plurality of holding elements for releasably securing the shaft member and at least one mixing member to at least one of the planar member and the frame member; (d) detaching the shaft and the mixing member from the holding elements; and (e) securing the mixing member onto a first portion of the shaft.

Still other non-limiting objectives and/or aspects of the disclosure will become apparent from a reading and understanding of the description of the preferred embodiments hereinbelow.

BRIEF DESCRIPTION OF THE DRAWINGS

The present development may take physical form in certain parts and arrangements of parts, preferred embodiments of which will be described in detail in this specification and illustrated in the accompanying drawings which form a part of the disclosure.

DETAILED DESCRIPTION OF THE PREFERRED EMBODIMENTS

It should, of course, be understood that the description and drawings herein are merely illustrative and that various modifications and changes can be made in the structures disclosed without departing from the spirit of the disclosure. Like numerals refer to like parts throughout the several views.

Figure 1:
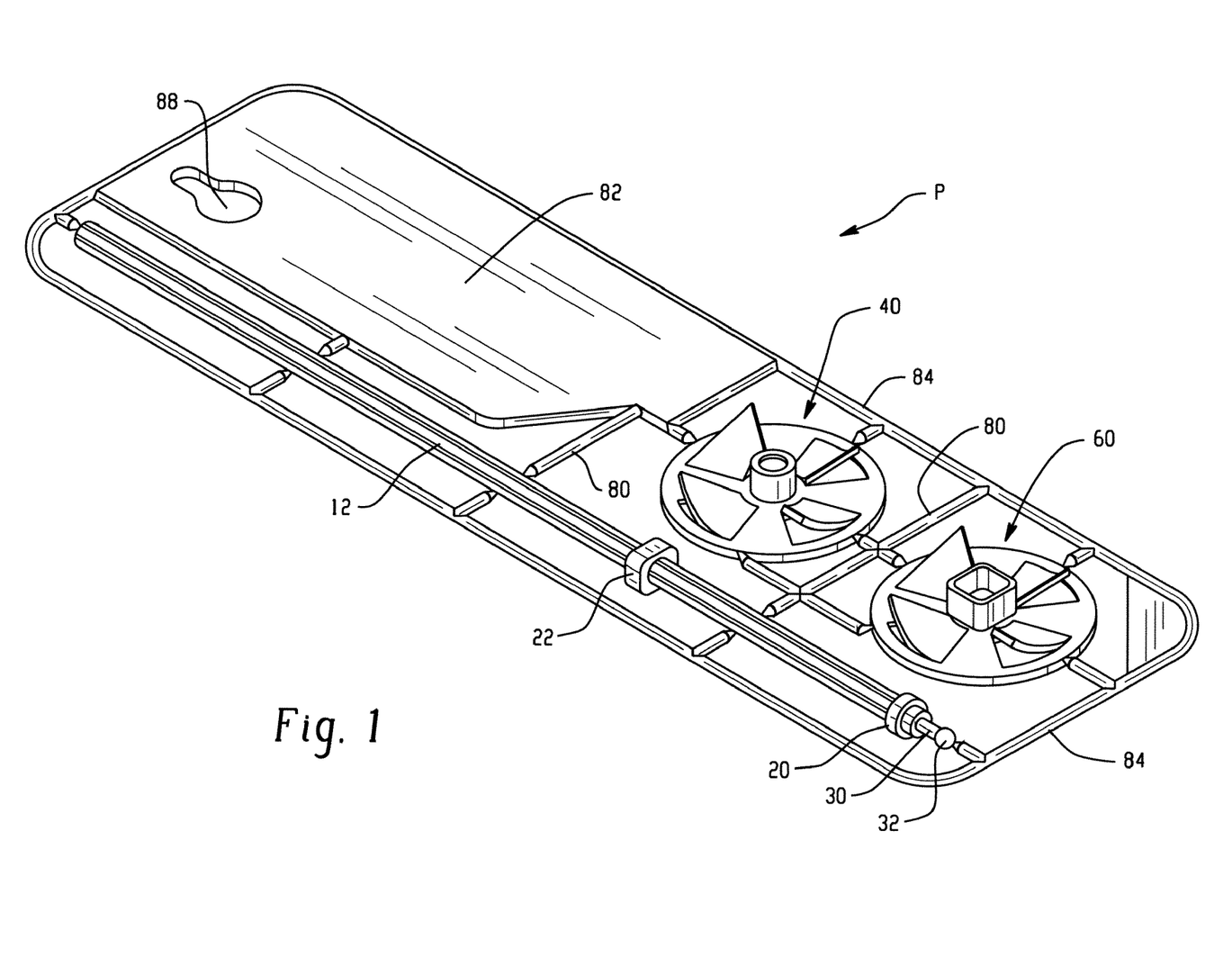
FIG. 1 is a perspective front view of the molded mixing device prior to assembly.
Figure 2:
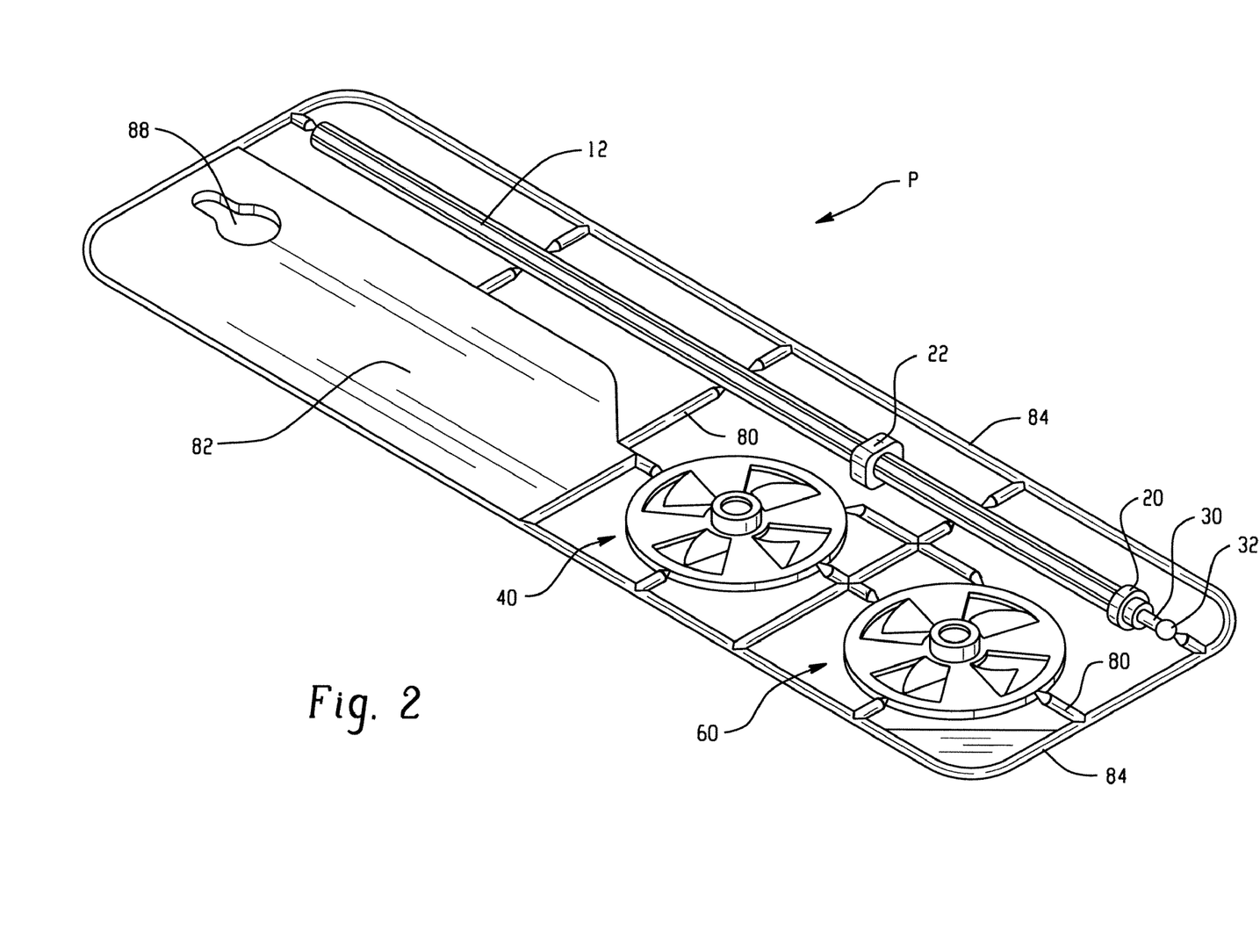
FIG. 2 is a perspective rear view of the molded mixing device prior to assembly.

Referring now to the drawings, wherein the showings illustrate a preferred embodiment of the development only and are not intended to limit same, FIGS. 1 and 2 show the packaging P of a rotary mixer 10 prior to assembly in accordance with one embodiment of the disclosure.

Figure 3:
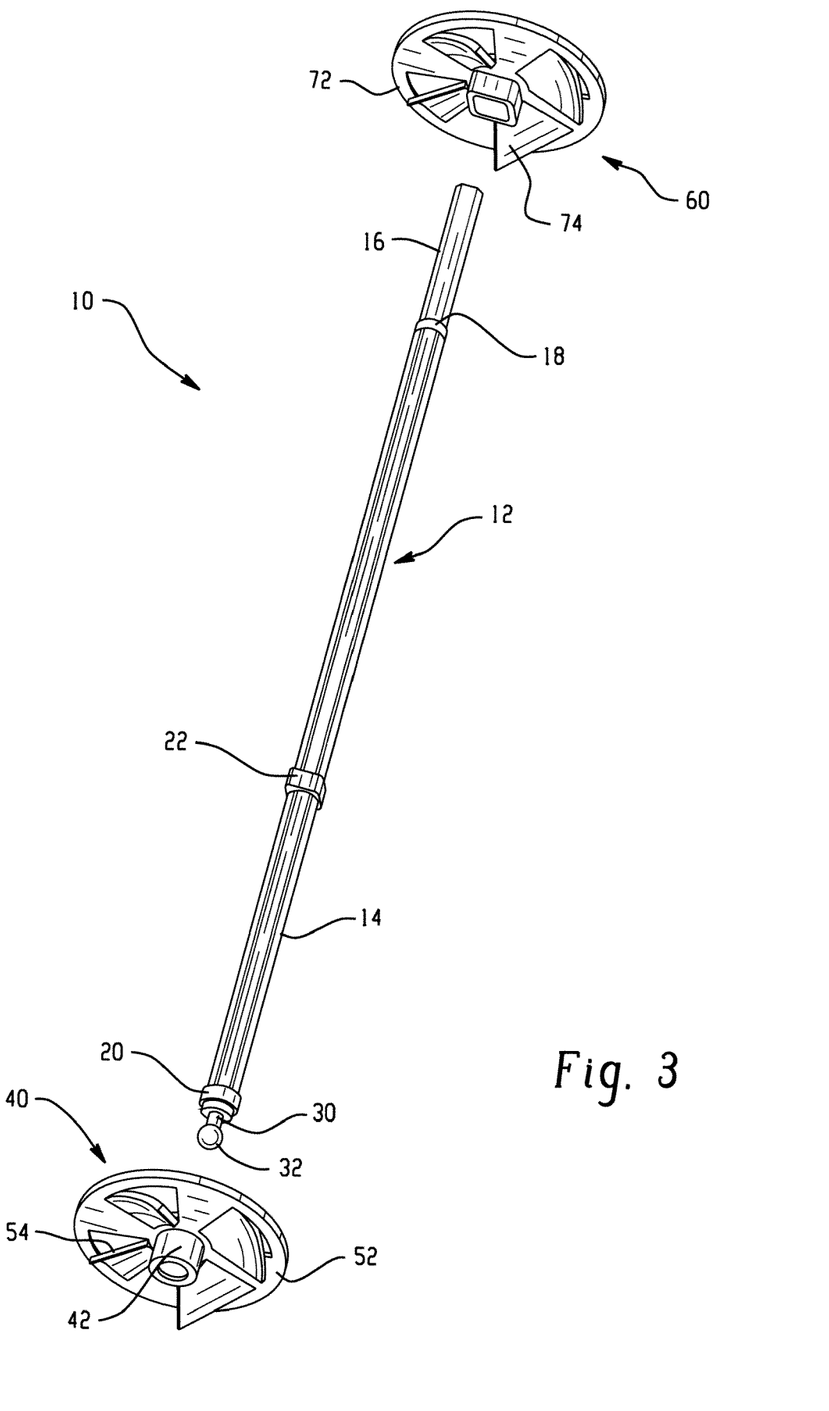
FIG. 3 is a perspective view showing the assembly of the shaft with a first mixing member and a second mixing member.
Figure 4A:
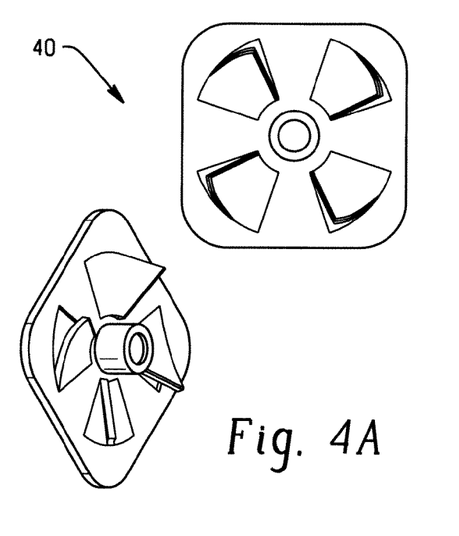
FIGS. 4A-4D are perspective views of various configurations of the mixing member.
Figure 4B:
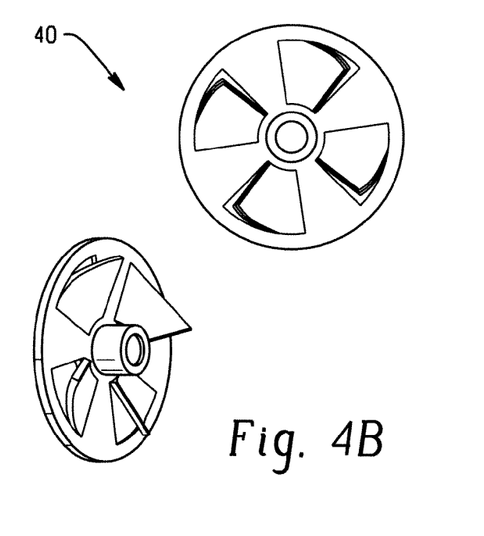
Figure 4C:
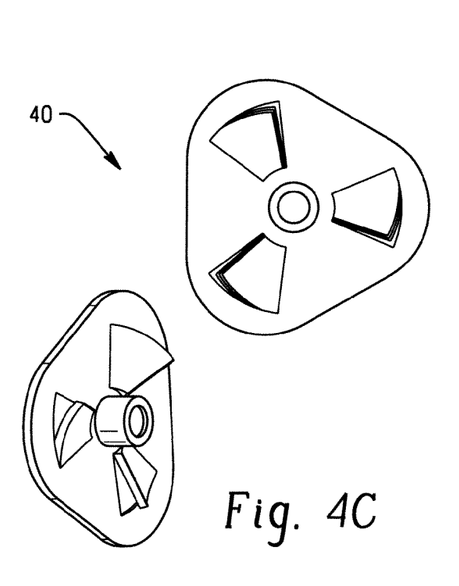
Figure 4D:
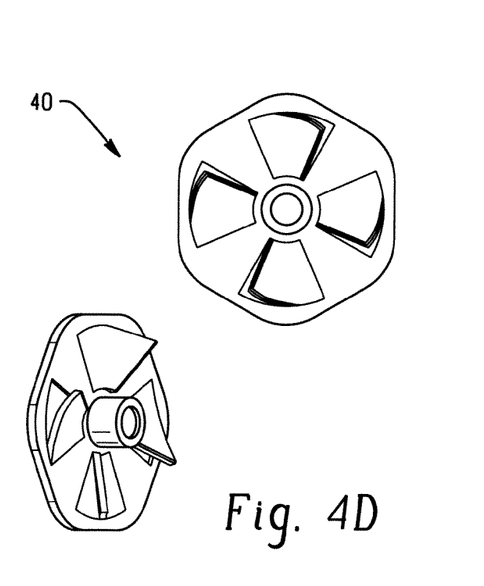

With reference to FIG. 3, the individually components of the rotary mixer 10 are depicted prior to assembly. The rotary mixer 10 is formed by the combination of a shaft 12, a first or lower mixing member 40, and a second or upper mixing member 60. As will be described more fully below, depending on the mixing application and the goals of the user, the lower mixing member 40 and the upper mixing element 60 can be used in combination or individually. Further, although the figures show the two mixing members 40, 60 as being the same size, this is not intended to be limiting and one may be smaller than the other. Both variants are within the ambit and scope of the present disclosure.

It should also be appreciated by one skilled in the art that the configuration of the two mixing members 40, 60 is not critical. With particular reference to FIGS. 4A-4D, one can see that the two mixing members 40, 60 can relate to any shape such as round, hexagonal, square, rectangular, triangular, or any other shape depending on the requirements needed for the end use. Such variations are within the ambit and scope of the present disclosure.

With reference to FIGS. 6A-6E, the assembled rotary mixer 10 in accordance with one embodiment of the disclosure is depicted. The lower mixing member 40 and the upper mixing element 60 are carried on the shaft 12 in spaced parallel relationship. Preferably the space between the two mixing members 40, 60 is somewhat less than approximately one-third of the length of the shaft 12, though this distance is not critical and variation will cause results that differ in different sized containers and different depths of material to be mixed and stirred. The length of the shaft 12 is not critical, but should be such as to allow the shaft to extend rearwardly or spacedly away from the two mixing members 40, 60 a sufficient distance to allow interconnection with an associated powering source (not illustrated) and provide for convenient use. The distance should not be greater than necessary, however, as this may induce undesirable vibratory reactions.

With continued reference to FIGS. 6A-6E, the shaft 12 includes a first portion 14 having a first cross-section and a second portion 16 having a second cross-section. The first cross-sectional shape is preferably cross, however, it should be appreciated that the first cross-sectional shape can relate to any shape such as round, hexagonal, square, cross, rectangular, triangular, or any other shape. The contour of the first portion 14 may allow for the shaft 12 to flex during normal mixing operations thereby improving upon the safety of the rotary mixer. Further, as an additional safety measure, the contour of the first portion 14 may allow for the shaft to sever with excessive force. The second cross-sectional shape is preferably hexagonal for accommodating the associated powering source, generally a drill chuck for a power drill. The first portion 14 is separated from the second portion 16 by a separating flange 18 extending radially from the shaft 12.

Figures 5A, 5B:
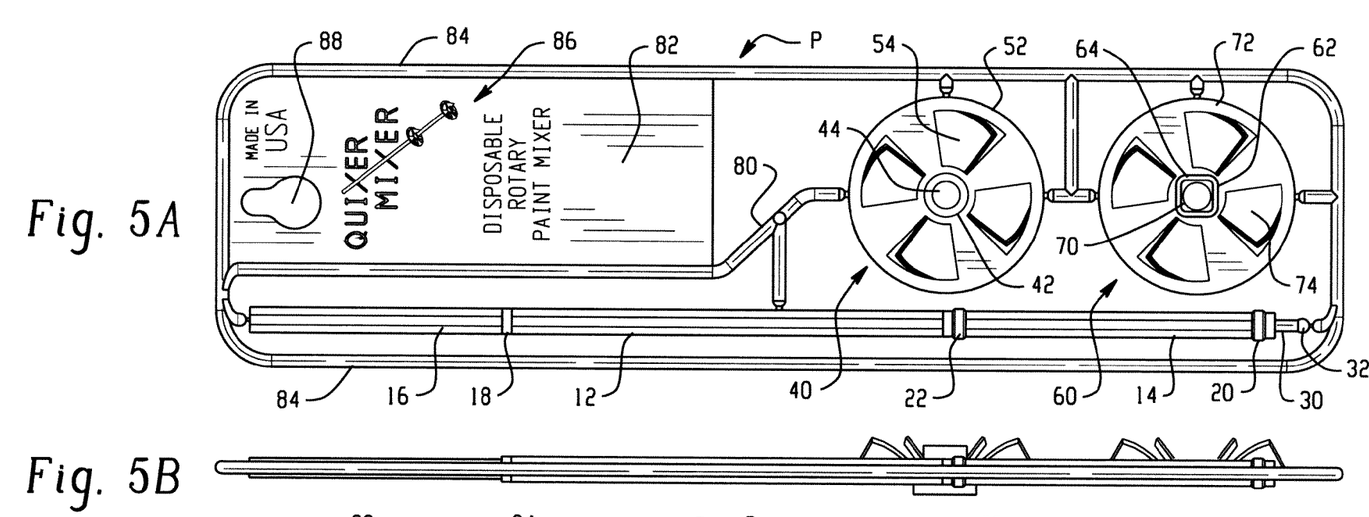
FIGS. 5A-5E represent various views of the molded rotary mixer device.
Figure 5C:
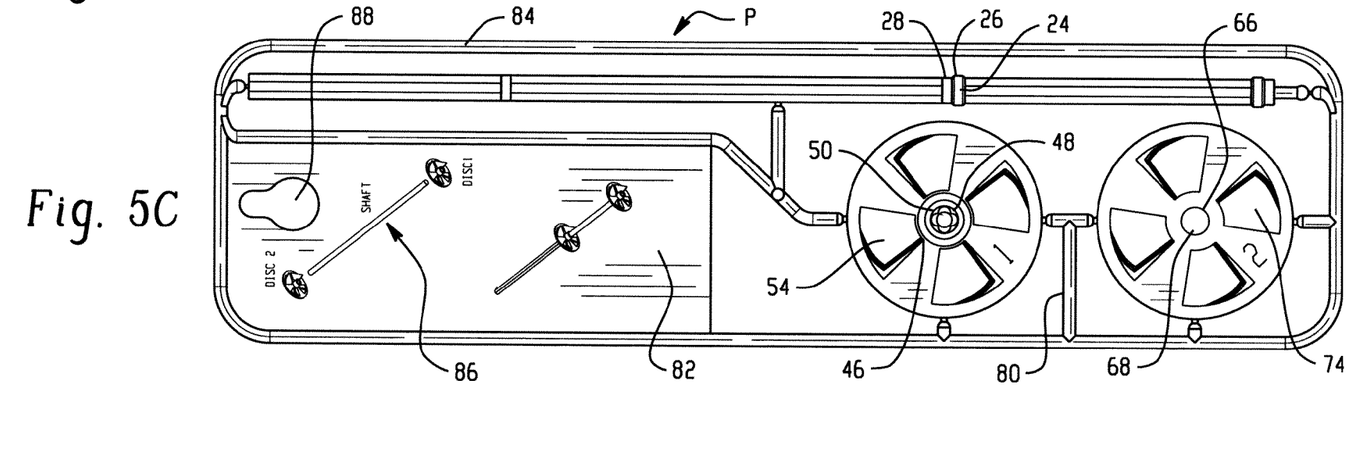
Figure 5D:
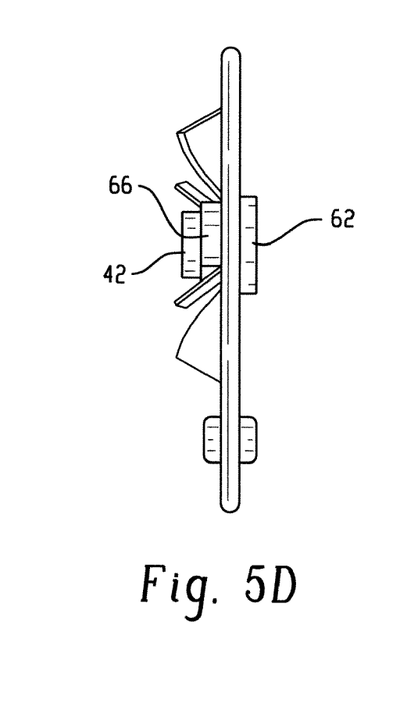
Figure 5E:
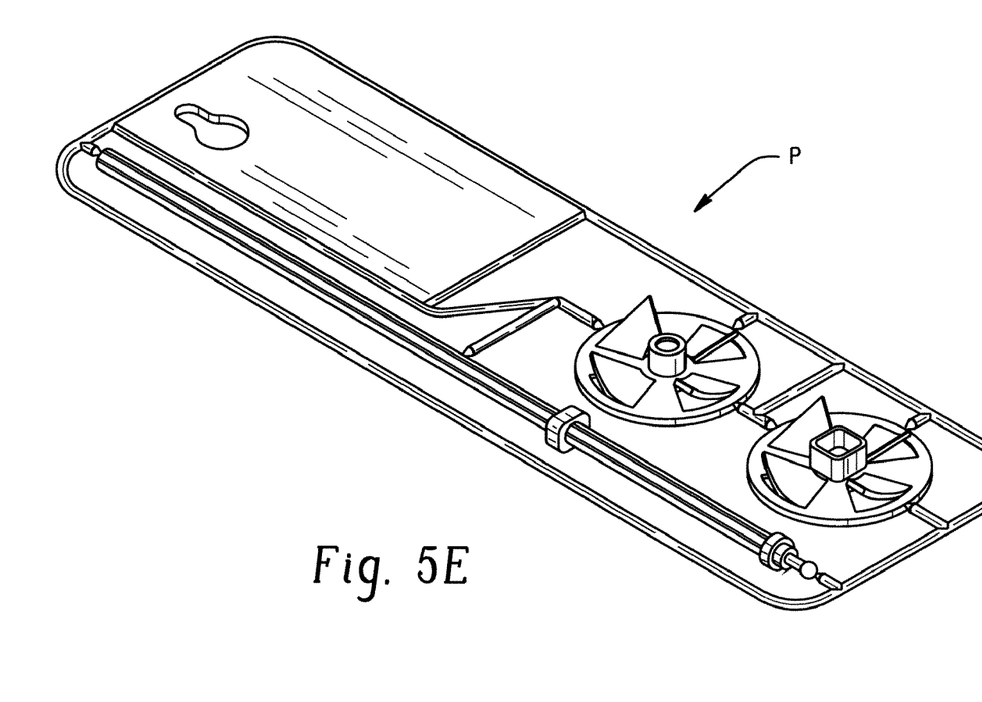
Figure 6A:
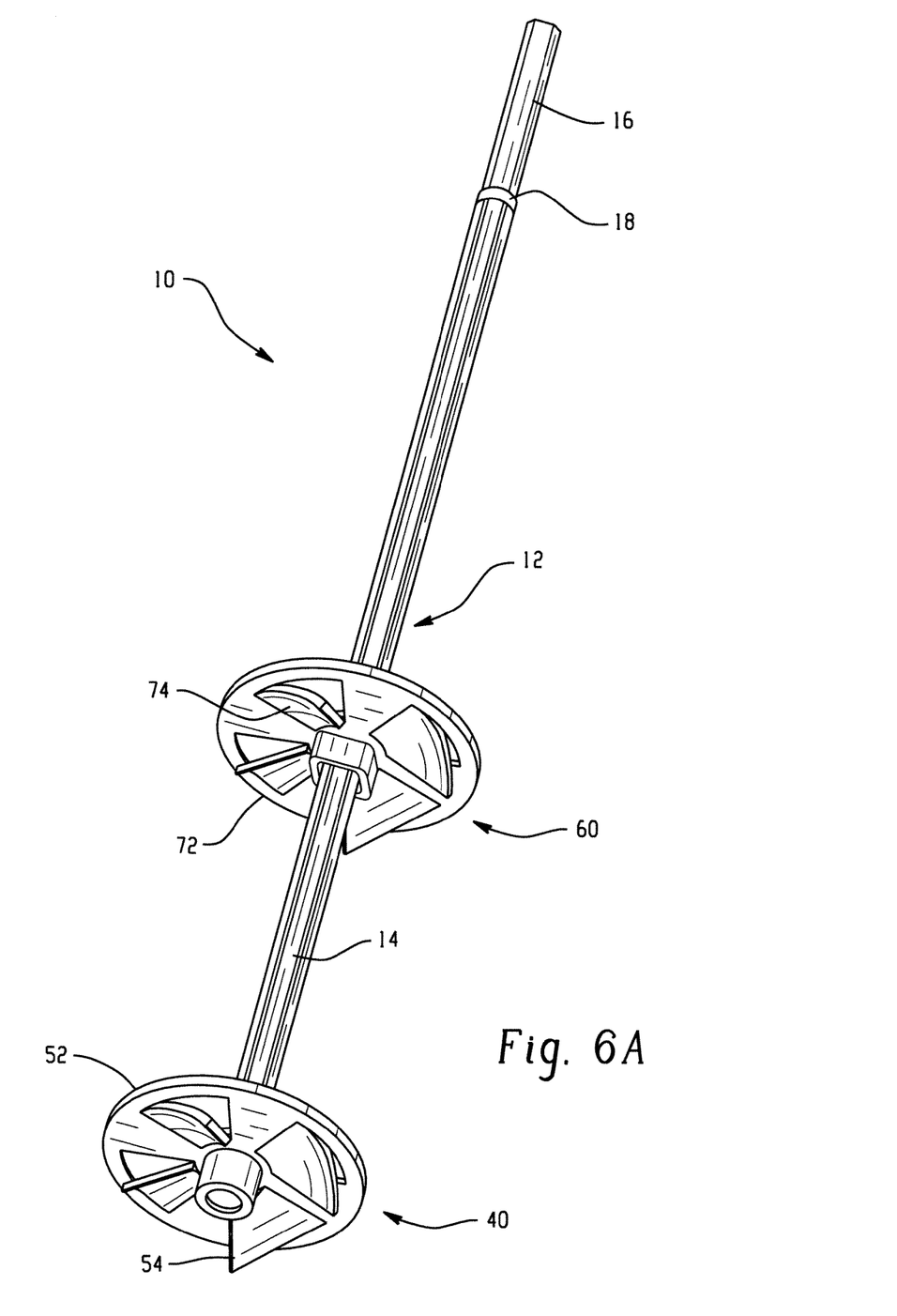
FIG. 6A-6E are perspective views demonstrating the assembled unit prior to usage.
Figure 6B:
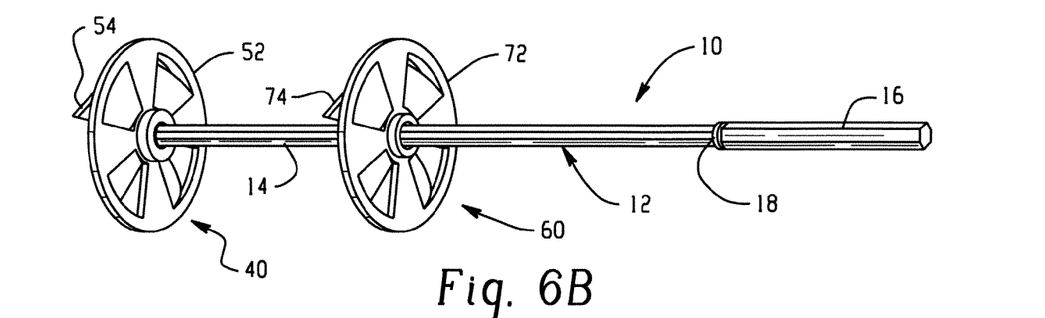
Figure 6C:
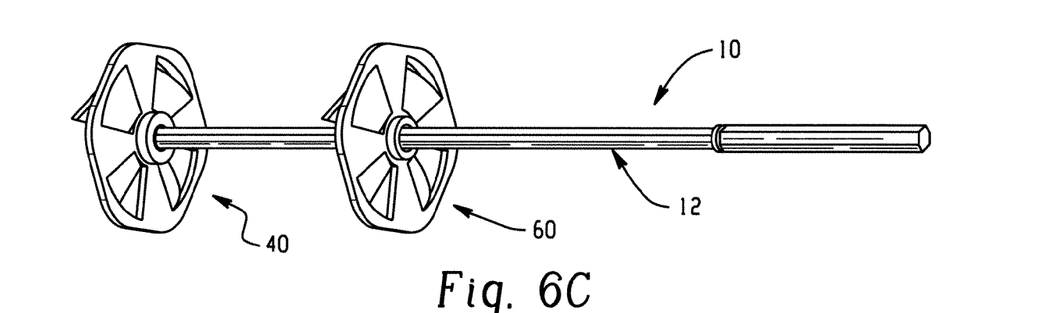
Figure 6D:
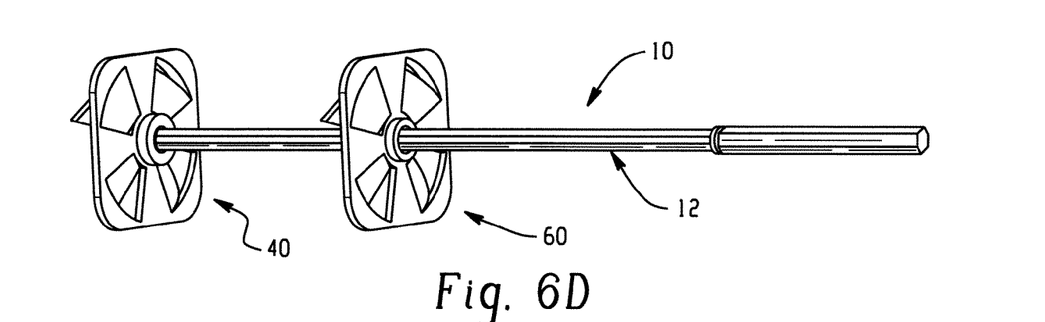
Figure 6E:
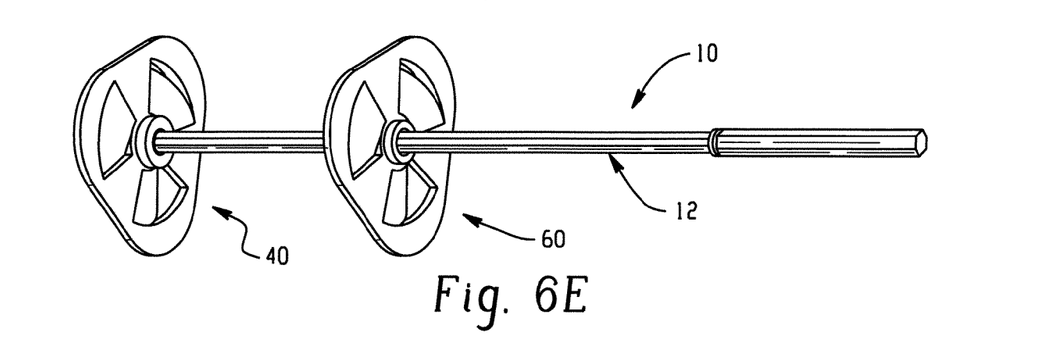

The first portion 14 of the shaft 12 generally includes at least one radially extending flange for securing at least one mixing member to the shaft. As shown in FIGS. 5A-5C, in one embodiment, the first portion 14 includes a first radially extending flange 20 for securing the lower mixing member 40 and a second radial flange 22 for securing the upper mixing member 60 (as will be described in greater detail below).

The first radial flange 20 is located adjacent an end of the first portion and has a general circular cross-sectional shape. However, other shapes such as hexagonal, square, rectangular and triangular may be utilized in securing the lower mixing member 40 to the first portion 14 of the shaft 12. The second radial flange 22 is spaced axially from the first radial flange 20 and has a general "ink-well" configuration. The second radial flange 22 includes a base 24 having a square cross-sectional shape, a neck 26 extending axially from the base 24 and a lip 28 extending radially from an end of the neck. See, for example, FIG. 5C. The ability to use other shapes, designs, or contours for the second radial flange 22 should be recognized as being within the scope and intent of the present disclosure.

It should be appreciated that the space between the first radial flange 20 and the second radial flange 22 is not critical, but should be such as to allow the two mixing members 40, 60 to efficiently mix and stir the intended liquid, compound, particulate matter, and other material.

With continued reference to FIGS. 5A-5C, the shaft further includes an axially extending protrusion 30 having a circular dome 32 at one end. As will be described in greater detail below, the protrusion 30 and circular dome 32 further assist in locking the lower mixing member 40 onto the first portion 14 of the shaft 12.

Looking more particularly to the lower mixing member 40, and with reference to FIGS. 5A-5C, the lower mixing member 40 includes a first centrally positioned boss 42 extending axially from a first surface of the lower mixing member. The boss 42 includes an aperture 44 dimensioned to receive the axially extending protrusion 30 and circular dome 32 of the first portion 14 of the shaft 12. The aperture 44 includes an inward extending shelf 94 adjacent an end of the boss 42. The protrusion and the circular dome are inserted into the aperture 44 of the boss 42 from a second surface of the lower mixing member 40. Preferably, the axial dimension of the boss is smaller than that of the protrusion 30 and the circular dome 32. As such, the circular dome 32 is forced past the inward extending shelf and a portion of the circular dome extends out of the aperture 44. Thus, the axial movement of the protrusion 30 and circular dome 32 in the aperture is prevented by the inward extending shelf.

With continued reference FIGS. 5A-5C, the lower mixing member 40 further includes a second centrally positioned boss 46 extending axially from the second surface of the lower mixing member. The boss 46 includes an aperture 48 dimensioned to receive the first portion 16 of the shaft 12 and the radial flange 20. The aperture 48 includes a portion 50 which has a cross-section contoured to mate the first cross-section of the first portion 14 of the shaft 12. This mating prevents the lower mixing member 40 from rotating relative to the first portion of the shaft during operation of the rotary mixer 10.

A rim 52 extends circumferentially around the lower mixing member 40. A plurality of blades 54 extends radially between the bosses 42, 46 and the rim 52. A trailing edge of at least one of the plurality of blades extends below the rim 52. The plurality of blades 54 has a concave surface along which an associated material to be mixed flows and wherein a degree of concavity of each blade changes along the length of the blade.

Looking more particularly to the upper mixing member 60, and with continued reference to FIGS. 5A-5C, the upper mixing member 60 includes a first centrally positioned boss 62 extending axially from a first surface of the upper mixing member. The boss 62 includes an aperture 64 dimensioned to receive the base 24 of the second flange 22 of the first portion 14 of the shaft 12. The contour or the base 24 and the aperture 64 prevent the upper mixing member 60 from rotating relative to the first portion of the shaft during operation of the rotary mixer 10. The upper mixing member 60 further includes a second centrally positioned boss 66 extending axially from a second surface of the upper mixing member. The boss 66 includes an aperture 68 dimensioned to receive the neck 26 and lip 28 of the second flange 22. The aperture 68 includes an inward extending shelf 70 adjacent an end of the boss 66. The shelf 70 has a dimension slightly larger than the neck 26 but slightly smaller than the lip 28 and upon insertion of the radial flange 22 into the aperture 64 of the first boss 62, the lip 28 is forced passed the shelf such that the shelf abuts an end of the base. As such, the shelf 70 is positioned between the base 24 and the lip 28 and circumferentially around the neck 26 thereby preventing the axial movement of the second flange 22 in the aperture 68.

A rim 72 extends circumferentially around the upper mixing member 60. A plurality of blades 74 extends radially between the bosses 62, 66 and the rim 72. A trailing edge of at least one of the plurality of blades extends below the rim 72. The plurality of blades 74 has a concave surface along which an associated material to be mixed flows and wherein a degree of concavity of each blade changes along the length of the blade.

To improve upon the safety of the rotary mixer 10 especially when an end user rubs the sides of an associated container, as set forth above and depicted in FIGS. 4A-4D, the plurality of blades 54, 74 are contained within the lower and upper mixing members 40, 60. As such, the plurality of blades will not gouge or bounce of the sides of a container which generally causes erratic mixing or splashing of fluids and materials being mixed. Still another important feature of the rotary mixer 10 is that the contour of the plurality of blades 54, 74 pulls the material to be mixed down and in towards the shaft 12 of the rotary mixer. As such, a vortex or cyclonic flow is created which prevents splashing or spilling. Further, the contour of the plurality of blades 54, 74 allows for clockwise and/or counterclockwise mixing.

Preferably, the rotary mixer 10 can be made of a conventional polymer material such that the rotary mixer is formed in a single molding operation. A polymeric rotary mixer has no sharp edges and is less likely to damage or cut a container when mixing. The components of the rotary mixer 10 are preferably formed of the same material and are produced by generally molding the components in essentially a single plane. Moreover, the runners 80 that provide the liquid polymer material to form the components of the rotary mixer 10 also serve as holding elements. Consequently, and as shown in FIGS. 1, 2 and 5A-5E, the one-piece, single shot molded packaging P is produced containing the components of the rotary mixer 10 and the holding elements 80.

Accordingly, a method of forming the packaging P and the rotary mixer 10 as a one piece, single-shot molded unit generally comprises the steps of (a) providing a mold (not illustrated); (b) molding the shaft 12, at least one mixing member 40, 60, at least one planar member 82 and a frame member 84; and (c) molding a plurality of holding elements 80 for releasably securing the shaft and at least one mixing member to at least one of the planar member and the frame member. The polymer material preferably readily accepts printing or inking materials (collectively indicia 86), allowing for instructions, promotional information, and the like, to be applied directly to the planar member 82. Alternatively, the indicia 86 can be a molded in label as shown on FIGS. 5A-5E. This combination eliminates the need for additional packaging material. The planar member 82 further includes a mounting aperture 88 which allows the packaging P to be held on an associated merchandise support assembly (not illustrated). It should also be appreciated that the configuration and size of the holding elements 80 and the frame member 82 depends on the size of the rotary mixer 10. As such, the variants in the configuration and size of the holding elements and the frame member are within the ambit and scope of the present disclosure.

When usage is desired, the rotary mixing device 10 of the present disclosure can be easily assembled by a consumer without tools. The shaft 12 and one or more of the mixing members 40, 60 are detached from the runners 80 which hold the molded components together. The mixing members 40, 60 are then slipped over the diameter of the shaft and are engaged into position as more fully described above. The runner system, which also acts to hold the components together in the end-molded product, is then subsequently discarded or recycled. The shaft 12 can then be inserted or joined with a powering source. Upon completion of usage, the entire assembled rotary mixer 10 can be easily discarded or recycled. This avoids any additional clean-up steps that can be time-consuming and/or expensive. Conversely, the rotary mixer 10 can be cleaned and stood on its end for drying.

The powering source (not illustrated) is not an essential part of the rotary mixer 10, but necessary for its practical use to provide rotary motion for the shaft 12. The powering source may be any of the various known devices for creating rotary motion in a shaft, but most commonly, by reason of availability and convenience, it preferable is an electric drill-type tool as such tools allow variation of the rotational speed within a fairly wide range which encompasses most, if not all, of the range desired for rotary mixing of materials of various viscosities. The electric drill-type tool is not, however, intended to be limiting and any tool that provides powered rotation in general may be used as a powering source.

Figure 7:
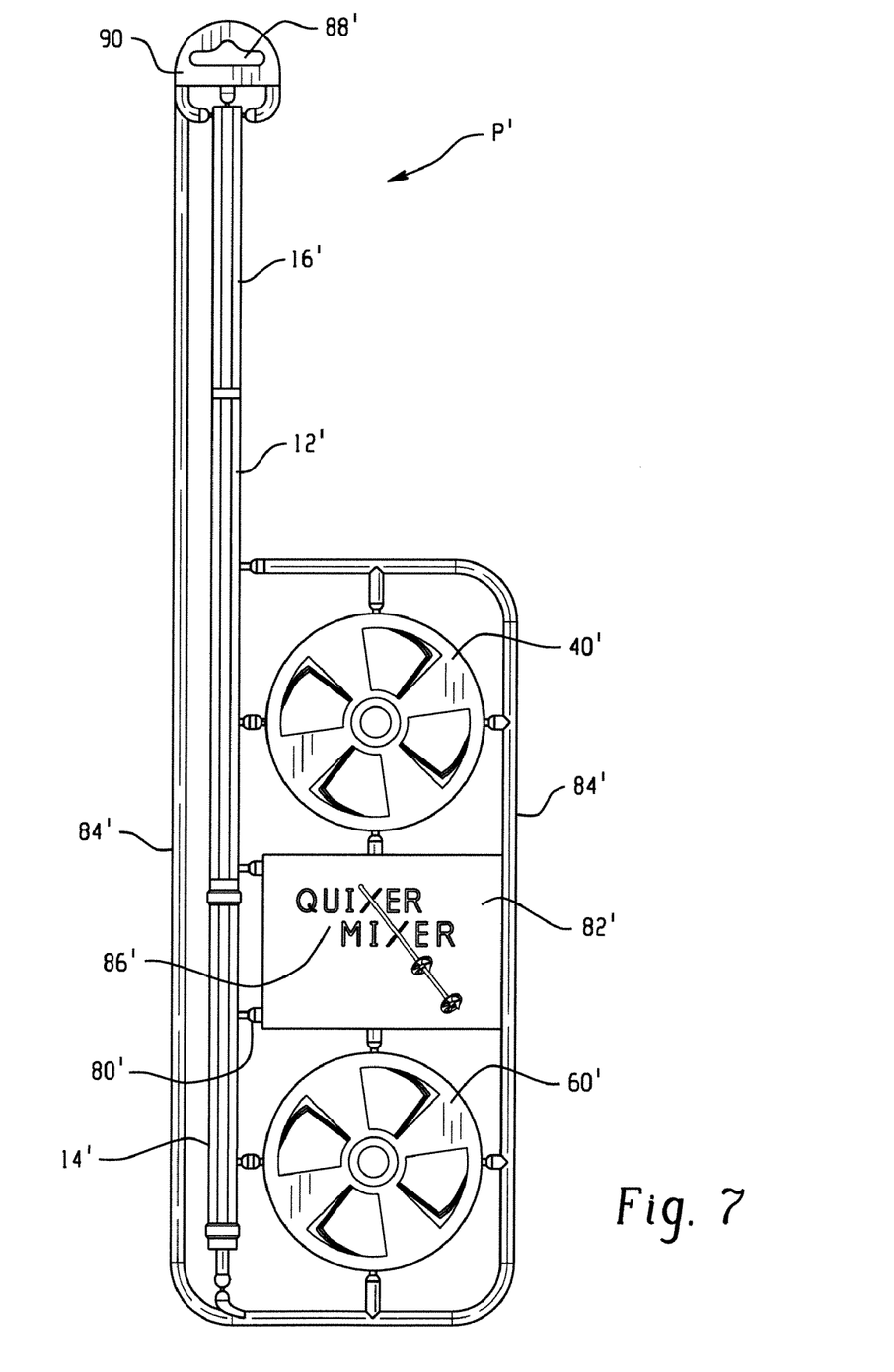
FIG. 7 is a perspective view of an alternative embodiment.
Figure 8:
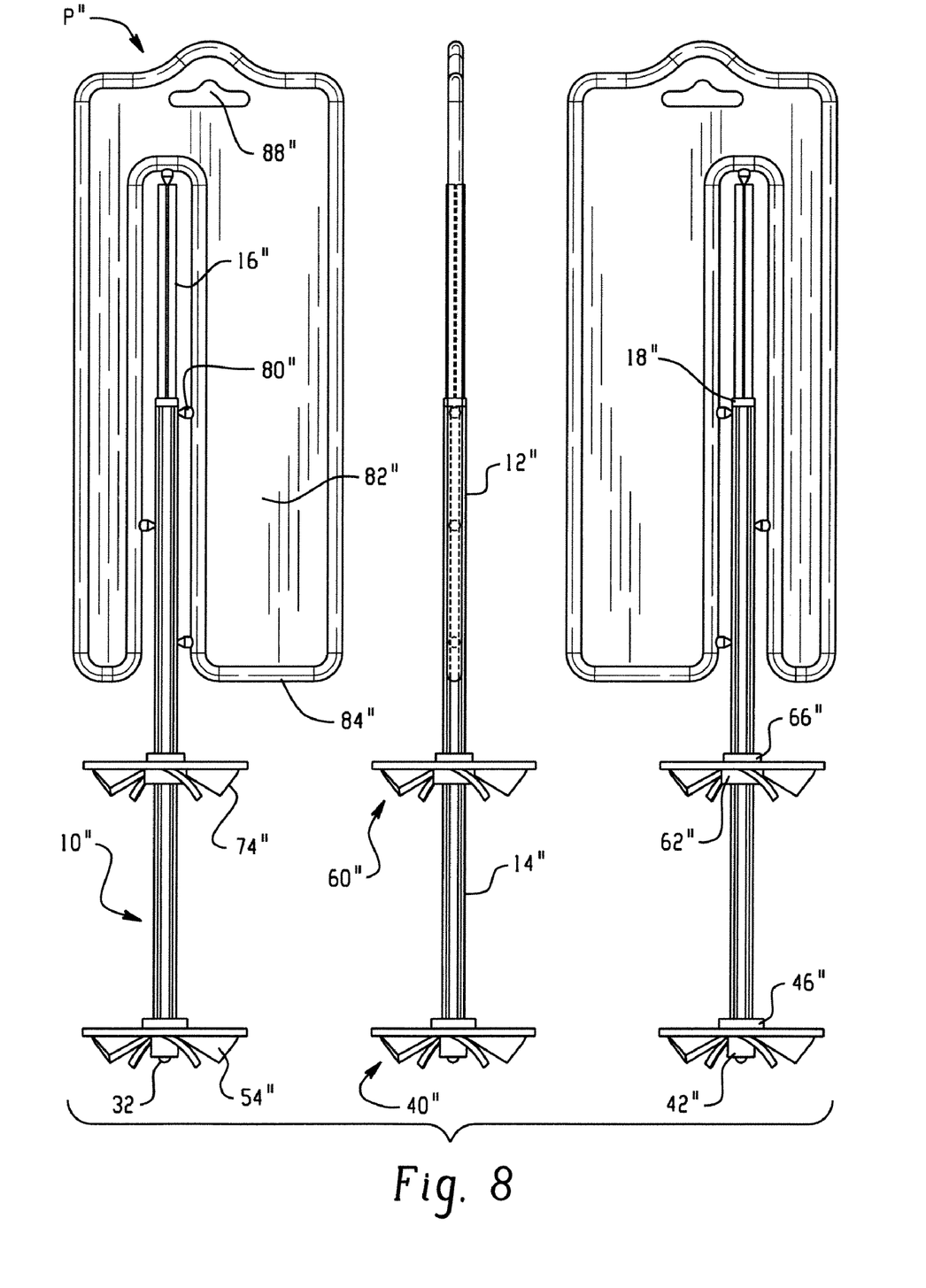
FIG. 8 is a perspective view of an alternative embodiment.

Similar to the aforementioned embodiment, two additional packaging embodiments are shown in FIGS. 7 and 8. Since most of the structure and function is substantially identical, reference numerals with a single primed suffix (') refer to like components (e.g., shaft is referred to by reference numeral 12'), and new numerals identify new components in the additional embodiment of FIG. 7. Likewise, reference numerals with a double primed (") suffix refer to like components (e.g., shaft is identified by reference numeral 12") in the additional embodiment of FIG. 8, and new numerals identify new components.

With reference to FIG. 7, the primary distinctions relate to the packaging P' of the rotary mixer 10', particularly, the configuration of the holding elements 80', the planar member 82' and the frame member 84'. The planar member 82' is located between the two mixing members 40', 60' and is releasably secured to the first portion 14' of the shaft 12'. As shown in FIG. 7, the packaging P' further includes a tab 90 releasably secured to the second portion 16' of the shaft 12'. The tab 90 includes a mounting aperture 88' which allows the packaging P' to be held on an associated merchandise support assembly.

With reference to FIG. 8, the primary distinctions relate to the configuration of the packaging P'" and the assembly of the rotary mixer 10". The holding elements 80" are releasably secured to the shaft 12" and a lower portion of the frame member 84" is axially spaced from the second mixing member 60". The two mixing members 40", 60" are integrally formed with the first portion 14" of the shaft 12" during the single-shot molding process described above. Accordingly, the rotary mixer 10" is packaged as a one-piece ready to use mixer that can be detached from the runners 80" and thereafter mounted to the powering source.

Accordingly, the embodiments disclosed herein exhibit one or more of the following non-limiting characteristics:

1) Disposable/recyclable/reusable;
2) Polymer/composite based.
3) Packaged as manufactured (shot of polymer creates packaged product—ejected from mold as complete product and is completely packaged).
4) No separate print material required (no paper instructions or bag needed). Can also have an applied label or molded in label (as in inlay molding or over-molding—special molding processes).
5) Consumer can easily assemble from package.
6) Can be assembled with 1 mixing disc or 2 or more mixing discs—depending upon fluid level or user preference.
7) Polymer mixer less likely to damage containers when mixing.
8) Mixing disc impellers are contained within a circle/diameter on outer diameter of disc—for safety, and when rubbing sides of container when mixing, it won't gouge or "bounce" off sides that could cause erratic mixing or splashing of fluids.
9) Can be made from many different types of polymers and/or different colors of polymers for different mixing applications.
10) Intended for use in hand drills—versions can be made for commercial mixing equipment.
11) Versions of product can be made all or any sizes for different mixing applications.
12) Snap together assembly—no tools required.
13) Twist components to remove them from frame—no tools required.
14) Molded polymer construction—can be many types of plastics and colors—even 2 or more types of plastic (as I multi-shot molding—a special molding process).
15) Can be post mold decorated (such as hot stamped or screened or pad printed or painted).
16) Mixer is not only intended for mixing paint, but may also be used for food and chemicals (additional line of specialty mixers).
17) Shaft can be flexible (for safety and mixing properties).
18) Shaft can optionally break with excessive force (for safety).
19) Shape of discs or impellers pulls mixed liquids and/or semi liquids down and in toward mixer which prevents splashing or spilling (mixing action creates vortex or tornado effect).
20) Shape of discs or impellers allows for clockwise and counterclockwise mixing.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A kit for mixing which comprises a shaft, a first mixing member, and a second mixing member disposed in a single plane:
   the shaft having:
      a first portion with a first cross-sectional shape and a second portion with a second cross-sectional shape,
      an end of the first portion including a first radially extending flange and an axially extending protrusion having a circular dome, and
      the first portion further including a second radially extending flange spaced axially from the first radially extending flange, wherein the second flange includes a base with a cross-sectional shape, a neck extending axially from the base, and a lip extending radially from an end of the neck;
   the first mixing member including:
      a first boss extending axially from a first surface of the first mixing member, the first boss including a first aperture, the first aperture adapted to receive the axially extending protrusion and the circular dome, and including a first inward extending shelf dimensioned to prevent axial movement of the shaft,
      a second boss extending axially from a second surface of the first mixing member, the second boss including a second aperture, the second aperture adapted to receive the first radially extending flange and the first portion of the shaft so as to prevent the first mixing member from rotating relative to the first portion of the shaft;
      a rim extending circumferentially around the two bosses, and
      a plurality of blades radially extending between the two bosses and said rim, wherein a trailing edge of at least one of the plurality of blades extends below the rim;
   the second mixing member including:
      a first boss extending axially from a first surface of the second mixing member, the first boss including a first aperture adapted to receive the base of the second radially extending flange so as to prevent the second mixing member from rotating relative to the first portion of the shaft,
      a second boss extending axially from a second surface of the second mixing member, the second boss including a second aperture, the second aperture adapted to receive the neck and the lip of the second radially extending flange, and including a second inward extending shelf adjacent an end of the second boss dimensioned to prevent axial movement of the shaft,
      a rim extending circumferentially around the two bosses, and
      a plurality of blades radially extending between the two bosses and said rim, wherein a trailing edge of at least one of the plurality of blades extends below the rim.

2. The kit of claim 1, further comprising a packaging member disposed in the single plane to which the shaft, first mixing member, and second mixing member are releasably secured.

3. The kit of claim 1, wherein the first cross-sectional shape of the first portion of the shaft is selected from the group consisting of a circle, a hexagon, a square, a cross, a rectangle, and a triangle.

4. The kit of claim 1, wherein the first cross-sectional shape of the first portion of the shaft is a cross.

5. The kit of claim 1, wherein the second cross-sectional shape of the second portion of the shaft is a hexagon.

6. The kit of claim 1, wherein the rim of the first mixing member and the rim of the second mixing member each define a shape, the shape being independently selected from the group consisting of a circle, a hexagon, a square, a rectangle, and a triangle.

7. The kit of claim 1, wherein the first radially extending flange has a cross-sectional shape that is different from the cross-sectional shape of the base of the second radially extending flange.

* * * * *